United States Patent [19]
Cox

[11] Patent Number: 5,717,263
[45] Date of Patent: Feb. 10, 1998

[54] ROTORS

[75] Inventor: Terence Martin Cox, Warrington, United Kingdom

[73] Assignee: British Nuclear Fuels PLC, United Kingdom

[21] Appl. No.: 583,034

[22] PCT Filed: Jul. 6, 1994

[86] PCT No.: PCT/GB94/01458

§ 371 Date: Mar. 18, 1996

§ 102(e) Date: Mar. 18, 1996

[87] PCT Pub. No.: WO95/02269

PCT Pub. Date: Jan. 19, 1995

[30] Foreign Application Priority Data

Jul. 6, 1993 [GB] United Kingdom ............. 9313943

[51] Int. Cl.$^6$ ........................................ H02K 7/02
[52] U.S. Cl. .................. 310/74; 310/261; 310/114; 428/65; 74/572
[58] Field of Search ..................... 310/74, 90.5, 114, 310/261; 74/572; 428/116, 65, 73; 415/90

[56] References Cited

U.S. PATENT DOCUMENTS

| | | | |
|---|---|---|---|
| 4,188,907 | 2/1980 | Lipani | 118/657 |
| 4,444,550 | 4/1984 | Loubier | 425/3 |
| 5,021,698 | 6/1991 | Pullen et al. | 310/156 |
| 5,124,605 | 6/1992 | Bitterly et al. | 310/74 |

FOREIGN PATENT DOCUMENTS

| | | | |
|---|---|---|---|
| 2204916 | 5/1974 | France | H02K 7/14 |
| 1 198 002 | 8/1989 | Japan | H01F 1/02 |

OTHER PUBLICATIONS

Scientific American, R.P. Post and S.F. Post, "Flywheels", see p. 21, and figures 3–5 and 8, Dec. 1973.

Proceedings of the 27th Intersociety Energy Conversion Engineering Conference, vol.4, Design and manufacturing for acomposite multi-ring flywheel., see p. 446, left col., Aug. 1992.

Primary Examiner—Steven L. Stephan
Assistant Examiner—Timothy A. Williams
Attorney, Agent, or Firm—Nixon & Vanderhye

[57] ABSTRACT

A rotor (10) comprising a cylindrical structure (30, 31) including a portion made from a fibre reinforced composite (38, 39) wherein magnetic filler within the matrix (44) of the composite and wherein the loading of the magnetic filler material varies through the matrix whereby the average mass per unit volume of the structure (10) decreases with distance radially from the axis of the structure (10). As a result, strain matching across the rotor can be achieved even when the rotor is spinning at high speed, such as when used in a flywheel energy storage and conversion apparatus.

16 Claims, 4 Drawing Sheets

ROTORS

The present invention relates to rotors especially rotors constructed from a fibre reinforced composite material.

Rotors may be constructed from fibre reinforced composites. Such rotors may be employed for example in electric motors and/or generators. In such applications the fibres of the composite may be wound helically or in hoops to give the construction appropriate mechanical properties.

In some applications it may be desirable for the rotor to be employed as a motor/generator or to be controlled electromagnetically as part of a machine and therefore the rotor may incorporate magnetic material or material which is influenced by a magnetic field.

According to the present invention a rotor comprises a cylindrical structure including a portion made from a fibre reinforced composite wherein filler material is incorporated within the matrix of the composite and wherein the loading of the filler material varies through the matrix whereby the average mass per unit volume of the structure decreases with distance radially from the axis of the structure, characterised in that the filler material is a magnetic filler material and the loading of the magnetic filler material varies smoothly through the matrix.

The said cylindrical structure may comprise a tubular configuration wherein the mass per unit volume decreases radially from the inner surface to the outer surface of the tube.

There is a difference in rotational speed between the outer surface and the inner surface of a tubular rotor. This causes a corresponding difference or mismatch in strain. By having a magnetic material loading gradient through the composite material from inner to outer surface of the said portion in accordance with the present invention the internal regions of the rotor structure may be designed to strain more at speed because of the higher loading than without the loading. At the outer regions of the said portion of the rotor structure where the magnetic material loading is low the strain will be minimal. In this way, the strain at the inner regions of the said portion of the rotor structure may be matched by the metal loading gradient to the strain at the outer regions. The whole magnetic material loaded composite rotor structure according to the present invention may therefore be operated in a strain matched manner. This allows greater tolerance of the rotor structure to stress cycling.

The said portion may be one or more tubular layers in a multi-layer tubular structure or it may itself comprise substantially the body of a tubular structure.

The composite of the rotor according to the present invention may be one of the known composites employed in the manufacture of rotors or known to be suitable therefor. Thus, the composite may comprise fibres selected from one or more of carbon, glass, boron, polyamide, polyaramid, polyolefin and the matrix material may comprise a cold setting and/or thermosetting and/or thermoplastic polymeric material eg selected from one or more of epoxy resins, polyester resins, Friedel Crafts resins, polyimides, polyether sulphones and polyether ketones (PEEK) optionally together with known additives, hardeners, fillers and the like. The fibres may be wound helically and/or in hooped fashion within the composite in a known way. Different layers may be wound in different configurations, eg in different helical senses. The fibres in each layer of fibres may be wound singly or as a collection of fibres within the composite, eg as tows.

The magnetic material employed in the loading of the composite material in the rotor according to the present invention may comprise particles, spheroids, whiskers, fibres or the like. Desirably, the material comprises powdered material. The magnetic material may comprise iron, nickel, cobalt or an alloy containing one or more of these. It may comprise a ferrite, eg barium ferrite. Alternatively, it may comprise a known hard magnetic material comprising a rare earth element, eg cobalt-samarium or neodymium-boron.

The magnetic material may suitably be incorporated in spaces between tows of fibres within the composite. The magnetic material may be applied in such spaces embedded in matrix material.

The magnetic material may be embedded in resin eg epoxy resin, in the formation of the rotor structure according to the present invention, eg by winding tows of fibres together with the resin loaded with magnetic material around a mandrel in a known way. The loaded resin employed may be obtained from a dispenser in which the loading content is gradually reduced with time. The resin may for example be an uncured liquid thermosetting resin, which after application to the spaces is cured to consolidate the composite.

The rotor according to the present invention may be used in known applications, eg as an electric motor and/or an electric generator which may form part of an energy storage flywheel system.

Embodiments will now be described by way of example with reference to the accompanying drawings, in which.

Figure 1:
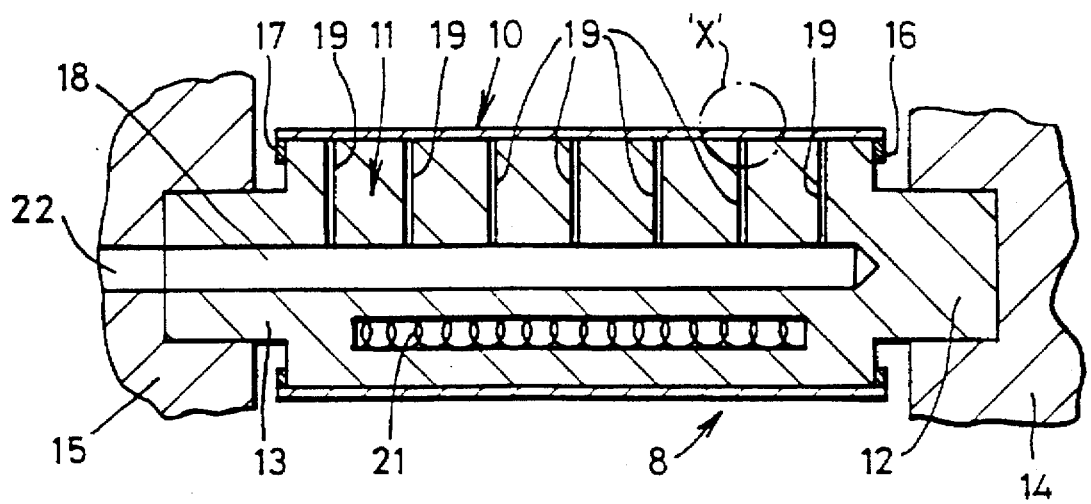
FIG. 1 is a sectional side view of a rotor about a stator.

Referring now to FIG. 1, an electric motor 8 is shown comprising a hollow cylindrical rotor 10 about a cylindrical stator 11 of laminated construction and which has end spigots 12, 13 for location in supports 14, 15. End rings 16, 17 at the ends of the rotor 10 hold the rotor 10 captive on the stator 11. A central blind hole 18 in the stator 11 communicates with a number (seven are shown) of radial holes 19 which exit at a narrow air bearing space 20 (not shown in FIG. 1) between the rotor 10 and the stator 11. Electrical coils 21 (only one is shown) are disposed in the stator 11 to provide an electric field to drive the rotor 10. A hole 22 in the support 15 communicates with the central hole 18 to provide a feed path for air to the air bearing space 20.

Figure 2:
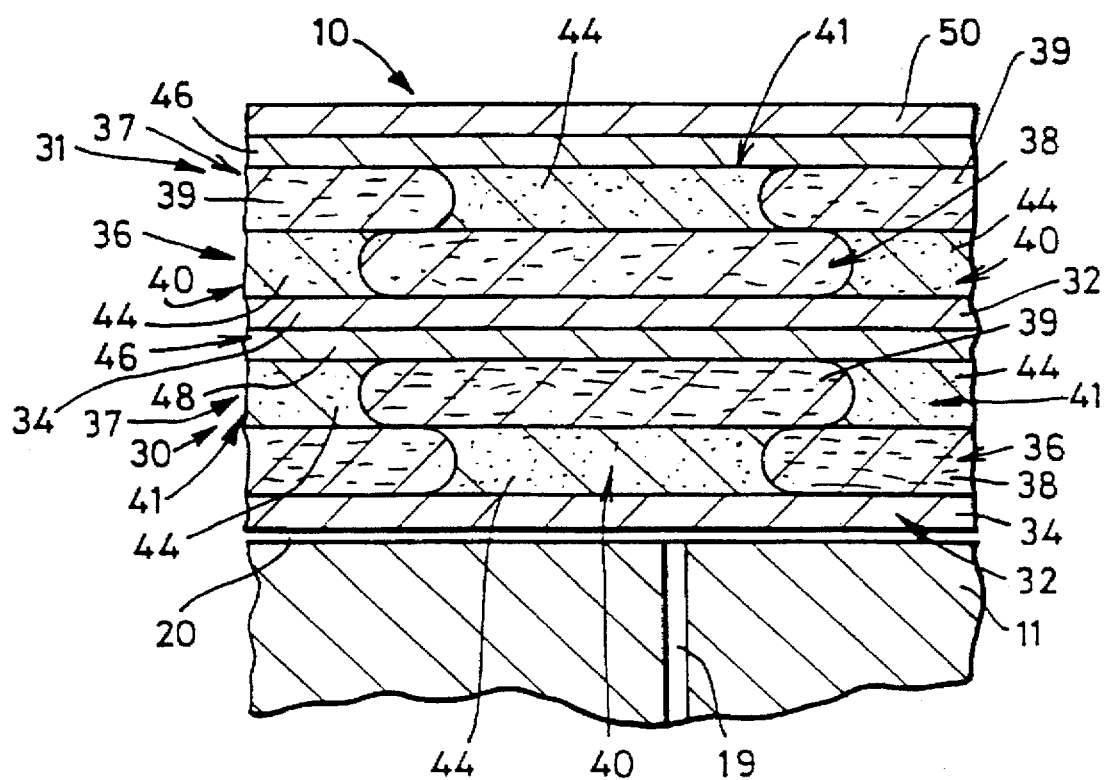
FIG. 2 shows to an enlarged scale that part of the rotor which is within the area labelled 'x' in FIG. 1.

As shown in more detail in FIG. 2, the rotor 10 comprises an inner shell 30, and an outer shell 31 superimposed on the inner shell 30. Two intermediate layers 36, 37, each comprising tows 38, 39 respectively of carbon fibres in an epoxy resin matrix, are wound circumferentially at the same multi-start helix angle. Spaces 40, 41 respectively between the tows 38, 39 are filled with a composite 44 comprising magnetic material powder held in an epoxy resin matrix. An outer layer 46 comprising tows 48 of carbon fibres in an epoxy resin matrix wound circumferentially closely together at a single start helix angle is superimposed on the intermediate layer 37. A final wear resistant (eg chrome) layer 50 is superimposed on the outer layer 46.

In use of the motor 8, air is fed through the holes 22, 18 and 19 to the air bearing space 20 to support the rotor 10. The coils 21 are energised and the resulting electric field rotates the rotor 10. Because of the light weight of the rotor 10 extremely high rotational speeds can be attained, ie above 20,000 revolutions rpm (eg 100,000 rpm), although the rotor 10 may be used below these speeds.

Figure 3:
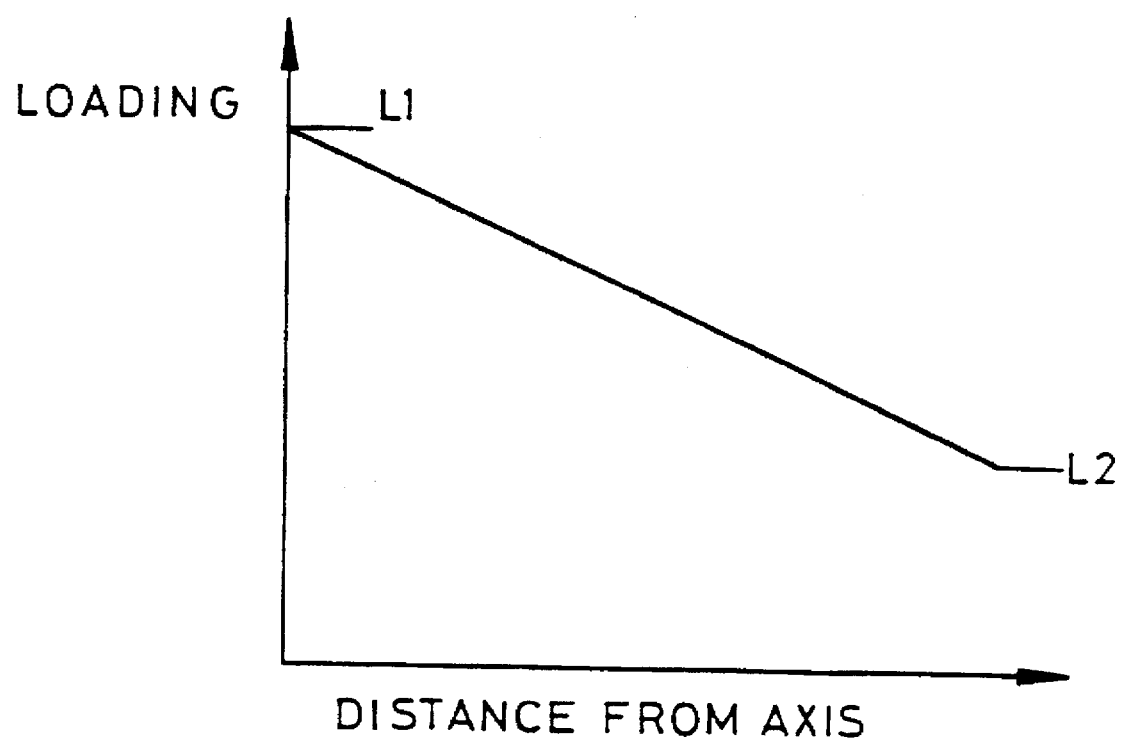
FIG. 3 is a graph illustrating the metal loading variation within the rotor shown in FIGS. 1 and 2.

FIG. 3 is a graph of the loading of the magnetic material within the composite 44 between the inner layer 34 and the outer layer 50. As is seen in FIG. 3, the loading is at a high level L1 adjacent to the inner layer 34 and gradually falls in a radial direction to a low value L2 adjacent to the outer layer 50. The mass per unit volume of the rotor 10 follows a similar graph whereby strains induced adjacent to the layer 50 match those induced adjacent to the layer 34.

Figure 4:
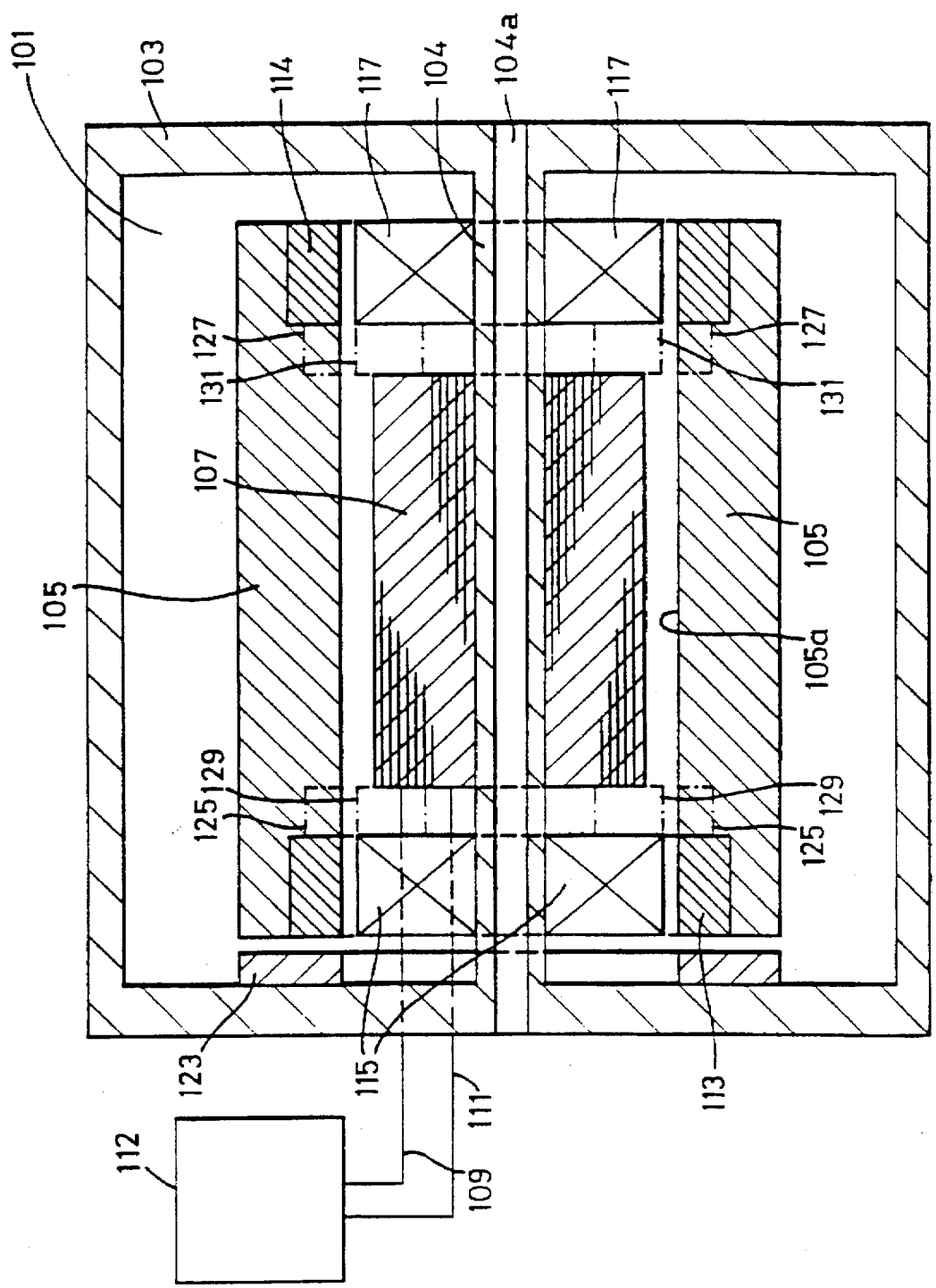
FIG. 4 is a sectional elevation of a rotor flywheel arrangement.

FIG. 4 shows an example of a rotor flywheel system incorporating a rotor 5 manufactured in the manner described above.

As shown in FIG. 4, a vacuum chamber 101 is enclosed by a drum shaped casing 103. A tubular shaft 104 is fitted between the ends of the casing 103 and extends along the axis of the casing 101. A cylindrical tubular rotor 105 is suspended in the chamber 101 co-axial with the tubular shaft 104. The rotor 105 comprises a fibre reinforced composite material and a magnetic material for example cobalt samarium. A stator 107 is mounted on the shaft 104 between the shaft 104 and the rotor 105. The stator 107 comprises a series of permanent magnets and includes also one or more electrical coils in contact with the permanent magnets. The coils are connected via conducting leads, two of which leads 109 and 111 are shown having insulating coatings (not shown) and fitted through one end of the casing 103, to an external circuit 112.

The rotor 105 incorporates at its ends rings 113, 114 of soft iron whose inner surfaces form part of the inner surface 105a of the rotor 105 facing the stator 107. Electromagnet systems 115, 117 are mounted on the shaft 104 adjacent to the ends of the stator 107 and face the rings 113, 114 respectively. Each electromagnet system comprises a common rectangular cross-sectional magnetic core ring and four active coils mounted equiangularly around the core. Each coil is connected to external conducting leads which are in turn connected to external circuits respectively which energise the coils of the electromagnet systems 115, 117. The external circuits also monitor and detect parameters which provide servo-control of the suspension of the electromagnet systems 115, 117 relative to the iron rings 113, 114 in the manner described in our EP 549,911A and EP 549,912A. The electromagnet systems 115, 117 and the rings 113, 114 thereby provide radial active magnetic bearing suspension of the rotor 105 about the starer 107. An active magnetic bearing system 123 adjacent to the end of the rotor 105 provides a thrust bearing which locates the rotor 105 in its required position on the axis of the shaft 104.

Magnetic rings 125, 127 formed on the inner surface of the rotor 105 may be optionally provided facing magnetic rings 129, 131 of similar polarity (as the rings they face) on the outer surface of the stator 107. The rings 125, 127, 129, 131 provide passive magnetic bearings to suspend the rotor 105 at low speeds.

Heat generated within the arrangement shown in FIG. 4 may be removed by passing a coolant, eg water, along the inside 104a of the tubular shaft 104.

In use, the arrangement shown in FIG. 4 may operate in either an electric motor or an electric generator mode. When the arrangement is acting as a motor the circuit 112 is switched whereby electrical energy is provided as an input to the coils of the stator 107 such that the rotor 105 is caused to rotate. The rotational speed of the rotor 105 may be very high, eg 100,000 to 200,000 revolutions per minute. When the arrangement is acting as a generator the rotation of the rotor 105 causes induction of a voltage in the coils of the starer 107 which is extracted as external energy via the circuit 112. The extracted voltage waveform may be converted in a known way, eg by smoothing, to a form which is suitable for use in an external lead, eg brushless dc motor.

Figure 5:
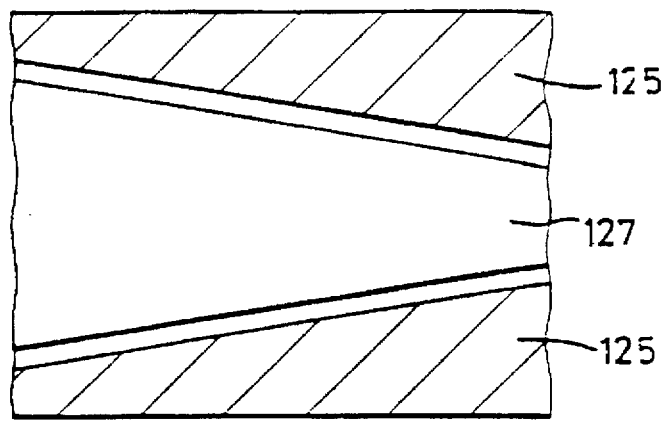
FIG. 5 shows in longitudinal section an alternative form of rotor and stator arrangement.
Figure 6:
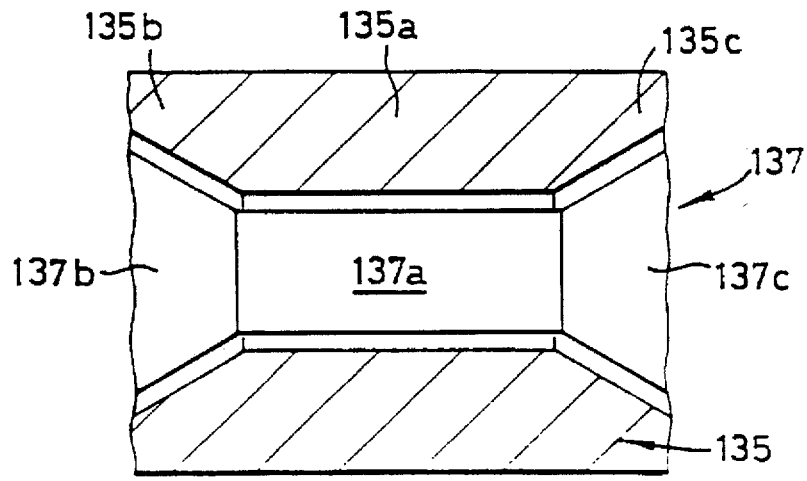
FIG. 6 shows in longitudinal section a further alternative form of rotor and stator arrangement.

Alternative geometrical forms for the rotor and starer are shown in FIGS. 5 and 6. In FIG. 5 the rotor 105 and stator 107 of FIG. 4 are replaced by a rotor 125 and stator 27. The other components of the device are not shown. The rotor 125 comprises a tubular cylinder whose transverse cross-sectional area increases along the length of the rotor 125 (from left to right as shown in FIG. 5). The transverse cross-sectional area of the stator 127 shows a corresponding decrease along its length whereby the gap between the rotor 125 and stator 127 is substantially constant along the length of the rotor 125.

In FIG. 6 the rotor 105 and stator 107 of FIG. 4 are replaced by a rotor 135 and stator 137. The other components of the device are not shown. The rotor 135 comprises a tubular cylinder whose transverse cross-sectional area is constant in the central portion 135a of the rotor 135 but which decreases toward the respective ends of the rotor 135 in regions 135b, 135c. The stator 137 correspondingly is of uniform transverse cross-sectional area in the central region 137a adjacent to the region 135a of the rotor 135 but increases toward the respective ends of the stator 137 in regions 137b, 137c adjacent to the regions 135b, 135c of the rotor 135 whereby the gap between the rotor 135 and stator 137 is substantially constant along the length of the rotor 135.

Figure 7:
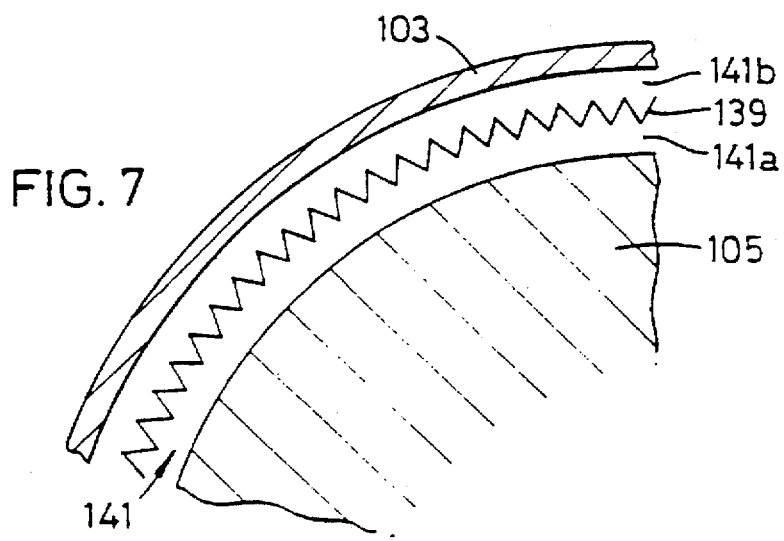
FIG. 7 shows a partial transverse section of the arrangement shown in FIG. 4 including the additional feature of a semi-permeable membrane.

FIG. 7 shows an arrangement whereby residual gas molecules in the chamber 101 (cf. FIG. 4) maybe removed to reduce parasitic energy losses. A corrugated membrane 139 is located in the space 141 of annular cross-section between the rotor 105 and the casing 103.

In use gas molecules in a region 141a of the space 141 are flung by the rotor 105 toward the membrane 139 and penetrate the membrane 139 to reach a region 141b behind the membrane where they become trapped.

I claim:

1. A rotor comprising a cylindrical structure including a portion made from a fiber reinforced composite wherein magnetic filler material is incorporated within the matrix of the composite and wherein the loading of the filler material varies smoothly and continuously through the matrix whereby the average mass per unit volume of the structure decreases with distance radially from the axis of the structure.

2. A rotor as claimed in claim 1, wherein the cylindrical structure comprises a tubular configuration wherein the mass per unit volume decreases radially from the inner surface to the outer surface of the tube.

3. A rotor as claimed in claim 1, wherein the magnetic filler material is loaded such that strain induced in the rotor during rotation of the rotor is substantially matched between the inner and outer regions of the rotor.

4. A rotor as claimed in claim 1, wherein the portion of the cylindrical structure comprises a plurality of tubular layers.

5. A rotor as claimed in claim 1, wherein the fibre reinforced composite comprises fibres selected from one or more of carbon, glass, boron, polyamide, polyaramid and polyolefin.

6. A rotor as claimed in claim 1, wherein the matrix material comprises a cold setting, thermosetting, or a thermoplastic polymeric material.

7. A rotor as claimed in claim 6, wherein the polymeric material is selected from one or more of epoxy resins, polyester resins, Friedel Crafts resins, polyimides, polyether sulphones and polyether ketones (PEEK).

8. A rotor as claimed in claim 1, wherein the fibres are wound helically and/or in hooped fashion.

9. A rotor as claimed in claim 1, wherein the magnetic material employed in the loading of the composite material in the rotor comprises particles, spheroids, whiskers or fibres.

10. A rotor as claimed in claim 1, wherein the magnetic material is a powdered material.

11. A rotor as claimed in claim 1, wherein the magnetic material comprises iron, nickel or cobalt, or an alloy containing one or more of iron, nickel or cobalt.

12. A rotor as claimed in claim 1, wherein the magnetic material includes a ferrite.

13. A rotor as claimed in claim 1, wherein the magnetic material comprises a rare earth element.

14. A rotor as claimed in claim 13, wherein the magnetic material comprises cobalt-samarium or neodymium-boron.

15. An electric motor and/or an electric generator forming part of a flywheel energy storage system comprising a rotor as claimed in claim 1.

16. A rotor as claimed in claim 12, wherein the ferrite is barium ferrite.

* * * * *